Dec. 13, 1960 A. R. RANGABE 2,964,667
INDIRECTLY HEATED INCANDESCENT CATHODES
Filed Sept. 3, 1957
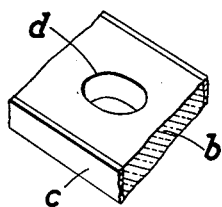
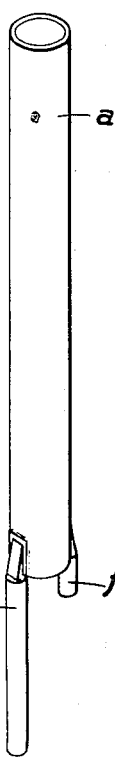
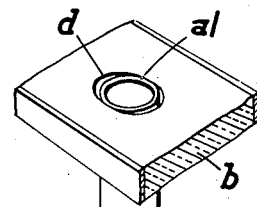
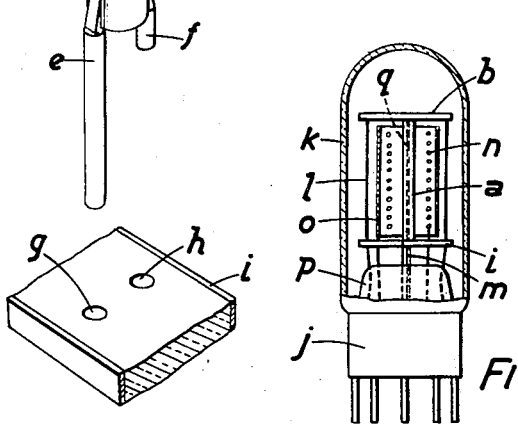
FIG. 1.
FIG. 2.
FIG. 3.

United States Patent Office 2,964,667
Patented Dec. 13, 1960

2,964,667

INDIRECTLY HEATED INCANDESCENT CATHODES

Alexander Rizo Rangabe, Denmead, England, assignor to The Plessey Company Limited, Ilford, England, a British company Filed Sept. 3, 1957, Ser. No. 681,858

Claims priority, application Great Britain Sept. 3, 1956

3 Claims. (Cl. 313—261)

This invention relates to indirectly heated thermoemissive cathodes. Such cathodes normally consist of a metal sleeve adapted to release electrons when heated by a suitable heating element accommodated inside the sleeve. When the cathode is incorporated in a valve, it is necessary for the sleeve to be supported firmly against lateral movement at both ends to eliminate microphony, under conditions involving mechanical vibration.

With normal constructions, this is very difficult to achieve, since the cathode sleeve, although firmly supported laterally, must be free to expand axially when heated, to obviate any tendency to bowing. If the sleeve were mounted in close-fit bores of the supports, the radial expansion of the sleeve when heated would tend to produce jamming and thus prevent free axial expansion.

The invention has for an object to provide a simple construction overcoming this difficulty.

According to the invention the sleeve is made of a high tensile, highly springy material which retains a high proportion of its strength and springiness at the operating temperature of the cathode, and it is held firmly but slidably in the valve support by the fact that a sleeve portion of substantially circular cross-section is elastically deformed locally from its normal cross-section shape by engagement with an elongated aperture of the support, the smallest diameter of said aperture being smaller than the diameter of said cross-section.

The sleeve is preferably made of tungsten-nickel alloy having a high tungsten content, say 35 to 40%, and may be of circular cross-section.

The deformation may be effected by making the corresponding hole in the valve support oval, with an interference fit. Preferably the resulting deformation is about 0.002 inch in the case of a 1 mm. dia. sleeve having a 0.001 inch (.025 mm.) wall. The required oval holes can be provided without much difficulty, both in mica and in the case of a ceramic valve support of the kind described in my co-pending patent application Ser. No. 649,932 filed April 1, 1957.

At the end at which the sleeve is connected to its terminal, a similar clamping effect may be obtained by brazing the ends of two wires to the outer side of the sleeve at diametrically opposite points of its cross-section, said wires being so secured in the valve that their distance when unstressed is slightly different from the outside diameter of the sleeve.

One or both of these wires may form the cathode lead as desired.

The hot strength of the tube at the operating temperature is sufficient to resist bowing under the influence of the frictional forces acting at the supports when it expands.

The drawing accompanying the provisional specification shows one embodiment of the invention, Fig. 1 being an "exploded" view, and Fig. 2 showing the sleeve in position, while Fig. 3 of the accompanying drawing is an elevation partly in section, of a triode valve incorporating the invention.

Referring now first to Fig. 1, the indirectly heated cathode is constituted by a thin-walled sleeve $a$ of circular section made of a tungsten-nickel alloy having a tungsten content of 35 to 40% by weight. Its outer dimension may be 1 mm. with a wall thickness of 0.025 mm.

A ceramic electrode support $b$, sintered in a metal frame $c$, substantially as described in my said copending patent application has a sleeve-receiving hole $d$ of elongated shape, of which the smallest diameter is about 0.002 inch less than the outside diameter of the tungsten-nickel sleeve $a$. The sleeve $a$ is accordingly locally deformed in cross-section when its end is inserted into the hole $d$ as shown at $a1$ in Fig. 2, so that it is held in contact with the wall of the bore by its resilience.

Two wires $e$ and $f$ parallel with the sleeve $a$ are brazed at the other end of the sleeve to diametrically opposite points of the outer side of the latter.

When the system is assembled, these wires are inserted in holes $g$ and $h$ respectively of a second support member $i$ of similar general construction to support $b$, $c$. The distance between holes $g$ and $h$ is slightly less than the distance between the wires determined by the outside diameter of the unstressed sleeve $a$, so that insertion of the wires into the holes $g$ and $h$ sets up a desirable prestress by deforming the cross-section of the adjacent end of the sleeve.

In the illustrated embodiment the wire $f$ terminates in the support $i$, only the wire $e$ being utilised for the conduction of the cathode current, but it will be readily appreciated that it may be preferred to use a long wire $f$ and employ both wires $e$ and $f$ for the current conduction.

Fig. 3 of the accompanying drawing shows the arrangement of a thermoemissive cathode according to the invention in a triode valve, being an example of an electron discharge device. The triode valve has a valve base $j$ carrying an evacuated envelope $k$, in which a pair of electrode supports $b$ and $i$ are mounted in spaced relation by means of two supporting wires $l$ fused in a well known manner in a glass pedestal $p$ inside the valve base. The cathode sleeve $a$ extends between the supports $b$ and $i$, one end being resilient held in an elongated bore of the support $b$, while the wire portions which are brazed to its other end are located in suitable bores of the second support $i$. Also mounted in any conventional or convenient manner on the supports $b$ and $i$ are two further electrodes, namely a grid $n$ and an anode $o$. Arranged inside the cathode sleeve $a$ is a heater loop $q$ connected to suitable base contacts by wires $m$.

It will be appreciated that the invention is by no means restricted to the application in vacuum triode valves but can, on the contrary, be used in a great variety of electron discharge devices requiring an indirectly heated cathode.

What is claimed is:

1. In an electron discharge device the combination of an indirectly-heated thermoemissive cathode comprising a thermoemissive sleeve of high-tensile, highly springy material which retains a high proportion of its strength and springiness at the operating temperature of the cathode, a pair of wires extending in the longitudinal direction of said sleeve and brazed to the sleeve adjacent one end thereof, respectively at diametrically opposite points of the sleeve, and extending beyond said end of the sleeve, and a support member of insulating material having a pair of spaced apertures into which the projecting portions of said wires respectively extend, the spacing of said apertures differing from the spacing of said wires in such manner as to resiliently deform the cross-section of said end of the sleeve.

2. In an electron discharge device, the combination of an indirectly heated thermo-emissive cathode comprising a thermo-emissive cathode sleeve of high-tensile, highly springy material which retains a high portion of its strength and springiness at the operating temperature of the cathode, said sleeve having a closed cross-section, and an electrode support having an aperture in which an end portion of the cathode sleeve is held, the shape of the aperture in the support differing in such manner from the cross-sectional outline of said end portion of the sleeve as to cause elastic deformation of the cross-sectional shape over at least the greater part of the cross-section of said end portion, said device further comprising a pair of wires extending parallel with the sleeve, said wires being brazed to said sleeve adjacent the other end of said sleeve at diametrically opposite points of the sleeve and projecting longitudinally beyond said other end of the sleeve, and a second electrode support having a pair of apertures through which said wires are threaded respectively, the spacing of said apertures being different from the spacing of said wires in such manner as to enforce resilient deformation of the cross-section of said other end of the sleeve.

3. In an electron discharge device, the combination of an indirectly heated thermo-emissive cathode comprising a thermo-emissive, elastically deformable cathode sleeve of high-tensile, highly springy material which retains a high portion of its strength and springiness at the operating temperature of the cathode, said sleeve having a predetermined cross-sectional shape in its undeformed state, an electrode support having an aperture therein of a predetermined cross-sectional shape, an end portion of said sleeve being positioned and held in said aperture, one of said cross-sectional shapes being circular and the other oval, a first diametral dimension of said end portion in its undeformed state being slightly greater than a corresponding diametral dimension of said aperture, and a second diametral dimension of said end portion at right angles to said first diametral dimension being substantially less than the corresponding dimension of said aperture so that said aperture causes inward elastic deformation of said end portion along said first diametral dimension and outward deformation of said end portion along said second diametral dimension when the end portion is positioned in said aperture in order to frictionally but slidably support said end portion in said aperture to allow radial and axial expansion of the sleeve when heated without buckling.

References Cited in the file of this patent

UNITED STATES PATENTS

| | | |
|---|---|---|
| 2,244,365 | Bucklin | June 3, 1941 |
| 2,266,622 | Green | Dec. 16, 1941 |
| 2,478,841 | Schmidt | Aug. 9, 1949 |
| 2,686,272 | Rogers | Aug. 10, 1954 |